(12) United States Patent
Munteanu et al.

(10) Patent No.: US 9,977,985 B2
(45) Date of Patent: May 22, 2018

(54) METHOD FOR PRODUCING A HISTOGRAM OF ORIENTED GRADIENTS

(71) Applicant: FotoNation Limited, Galway (IE)

(72) Inventors: Mihai Constantin Munteanu, Brasov (RO); Vlad Georgescu, Brasov (RO); Corneliu Zaharia, Brasov (RO); Iulia Suciu, Brasov (RO)

(73) Assignee: FotoNation Limited, Galway (IE)

( * ) Notice: Subject to any disclaimer, the term of this patent is extended or adjusted under 35 U.S.C. 154(b) by 79 days.

(21) Appl. No.: 15/160,835

(22) Filed: May 20, 2016

(65) Prior Publication Data

US 2017/0098135 A1    Apr. 6, 2017

Related U.S. Application Data

(63) Continuation-in-part of application No. PCT/EP2015/073058, filed on Oct. 6, 2015.

(51) Int. Cl.
  *G06K 9/46* (2006.01)
  *G06K 9/48* (2006.01)
  *G06K 9/62* (2006.01)
  *G06T 1/20* (2006.01)

(52) U.S. Cl.
  CPC .......... *G06K 9/4647* (2013.01); *G06K 9/481* (2013.01); *G06K 9/6267* (2013.01); *G06K 2009/485* (2013.01); *G06T 1/20* (2013.01)

(58) Field of Classification Search
  CPC ........... G06T 1/20; G06T 5/40; G06K 9/4647; G06K 2009/485; G06K 9/4642
  See application file for complete search history.

(56) References Cited

U.S. PATENT DOCUMENTS

2016/0148071 A1* 5/2016 Desappan ............ G06K 9/4647
                                                          382/103
2017/0116718 A1* 4/2017 Richmond ........... G06K 9/4642

FOREIGN PATENT DOCUMENTS

WO    WO2014146983         9/2014

OTHER PUBLICATIONS

Chen et al., "An Efficient Hardware Implementation of HOG Feature Extraction for Human Detection" IEEE Transactions on Intelligent Transportation Systems, vol. 15, No. 2, Apr. 2014, pp. 656-662.*

(Continued)

*Primary Examiner* — Brian Werner

(57) ABSTRACT

A method for producing a histogram of oriented gradients (HOG) for at least a portion of an image comprises dividing said image portion into cells, each cell comprising a plurality of image pixels. For each image pixel of a cell, a horizontal gradient component, gx, and a vertical gradient component, gy, is obtained based on differences in pixel values along at least a row of said image and a column of said image respectively including the pixel. A gradient is allocated to one of a plurality of sectors, each sector extending through a range of orientation angles. At least some of said sectors are divided from adjacent sectors along lines including $gx=2^n \cdot gy$, where n is any integer value with a magnitude greater than or equal to 1. At least one sector is associated with a bin; and a count of each instance of a pixel gradient of a cell associated with a bin is performed to provide a HOG for said cell.

40 Claims, 14 Drawing Sheets

(56) References Cited

OTHER PUBLICATIONS

Negi et al., "Deep pipelined one-chip FPGA implementation of a real-time image-based human detection algorithm", IEEE publication, copyright 2011, 8 pages total.*
Triggs, "Historgram of Oriented Gradients for Human Detection", IEEE Computer Society Conference on Computer Vision and Pattern Recognition, vol. 1, p. 886-893, Jun. 25-26, 2005.
Dalai, "Finding People in Images and Videos" PhD Thesis, L'institut National Polytechnique De Grenoble, Jul. 17, 2006.
Kadota, et al, Hardware Architecture for HOG Feature Extraction, Proceedings of 5th International Conference on Intelligent Information Hiding and Multimedia Signal Processing, 2009 pp. 1330-1333.
Cao, et al, "Implementation of Real-time Pedestrian detection on FPGA", Image and Vision Computing new Zealand, 2008, 23rd International Conference, p. 1-6.

* cited by examiner

METHOD FOR PRODUCING A HISTOGRAM OF ORIENTED GRADIENTS

FIELD OF THE INVENTION

The present invention relates to a method for producing a histogram of oriented gradients.

BACKGROUND

Navneet Dalal and Bill Triggs, "Histograms of Oriented Gradients for Human Detection", IEEE Computer Society Conference on Computer Vision and Pattern Recognition, vol 1, page 886-893, 25-26 Jun. 2005; and Navneet Dalal "Finding People in Images and Videos" PhD Thesis, L'institut National Polytechnique De Grenoble, 17 Jul. 2006, disclose Histogram of Oriented Gradient (HOG) descriptors for use in image processing including for object detection and/or classification.

FIG. 1 shows a simple example for calculating a HOG for a localized portion of an image, referred to herein as a cell.

In the example of FIG. 1, a 2×2 pixel cell is employed. Each pixel value is combined with a 3×1 kernel to determine the respective horizontal components of the gradients for the pixels of the cell; and with a 1×3 kernel to determine the vertical components of the gradients for the pixels of the cell. (It will therefore be appreciated that pixel values from a border of one pixel around the 2×2 cell are needed in order to calculate the gradients for each pixel of the cell.) In the example of FIG. 1, the pixels values for the corners of the border, 4, 0, 7 and 4 are shown for information only as these are not required for the exemplary kernels of FIG. 1. However, it will be appreciated that other kernels could be employed which might require these or other pixels.

The horizontal and vertical gradient components are combined to provide vector gradients for each pixel of the cell. Using the gradients, a magnitude and orientation of each pixel gradient for the cell can be calculated. In the example of FIG. 1, the gradients are mapped to one of 8 bins and a HOG can then be determined by counting occurrences of gradient orientation. In the example, 3 vectors are in bin 2 and 1 in bin 3 indicating the gradient for this portion of the image is generally in the direction of bin 2. (This is not shown aligned with the values shown in the sample input image.) The magnitude values for each pixel gradient can then be used to determine the extent of the gradient in that direction.

It is this combination of HOG and magnitude values that is referred to herein as the HOG descriptors for a cell.

In FIG. 1, the pixels values used comprise luminance values, for example, a Y component for a YCC format image. In other implementations, color gradients might also be calculated based on this or other image formats.

As will be seen from the example of FIG. 1, simple applications based on HOG descriptors would require the use of:
  multipliers—to calculate the magnitude of the gradients; and
  arc tangent function to calculate the orientation of the gradients.

Clearly optimization of each of these calculations would allow for a more rational implementation for providing HOG descriptors and in particular this would allow for an efficient hardware implementation providing HOG descriptors in devices with limited processing capability such as hand-held cameras or smartphones.

Ryoji Kadota et al, "Hardware Architecture for HOG Feature Extraction", Proceedings of 5th International Conference on Intelligent Information Hiding and Multimedia Signal Processing, 2009 pages 1330-1333, discloses several methods to simplify the computation of HOG descriptors, such as conversion of the division, square root and arctangent to simpler operations.

Tam Phuong Cao et al, "Implementation of real-time pedestrian detection on FPGA", Image and Vision Computing New Zealand, 2008, 23rd International Conference, p1-6 discloses dividing gradient orientations into non-uniform angular bins.

SUMMARY

According to the present invention there is provided methods for producing a histogram of oriented gradients according to each of claims 1, 29 and 34.

In further aspects there is provided image processing systems including logic for implementing the methods of claims 1, 29 and 34.

In a still further aspect, there is provided an image processing system as claimed in claim 27.

Embodiments of the present invention are suitable for efficient provision in hardware of HOG descriptors. The invention does not require multipliers and arc tangent function for implementation. It only requires adders and comparators, resulting in a fast hardware implementation with a small footprint.

Embodiments of the invention also provide a very flexible way of combining HOG sectors into bins.

BRIEF DESCRIPTION OF THE DRAWINGS

Various embodiments of the present invention will now be described, by way of example, with reference to the accompanying drawings, in which.

DESCRIPTION OF THE PREFERRED EMBODIMENTS

Figure 1:
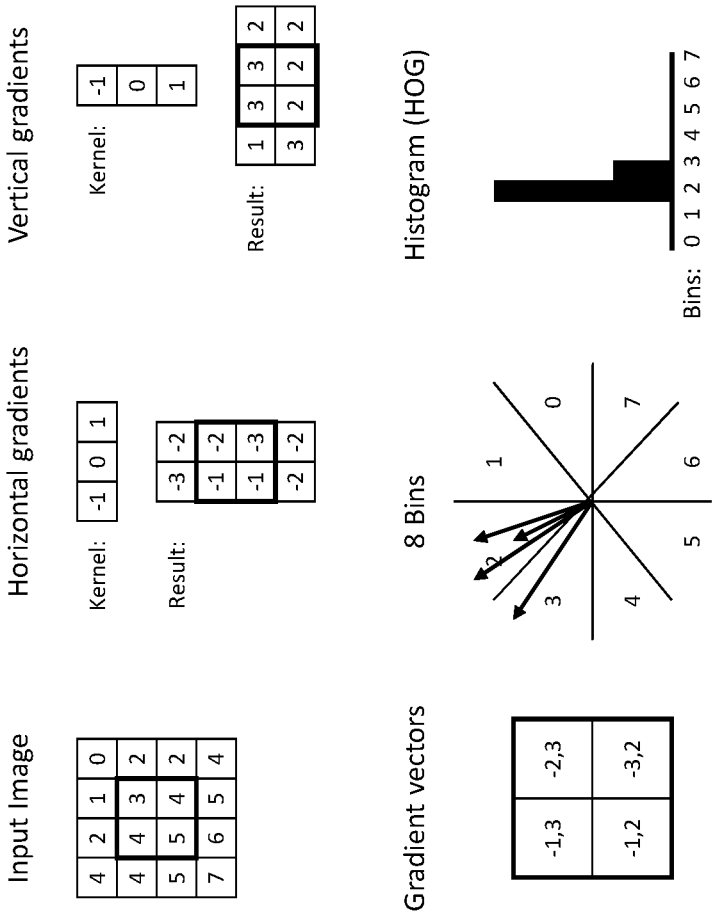
FIG. 1 illustrates a conventional calculation of a HOG for a cell.

Theoretically, to find the orientation of a gradient for a pixel, the arc tangent function is used:

$$\text{orientation} = \arctan(gx/gy)$$

where gx is the horizontal component and gy the vertical component of the gradient calculated for example, using the kernels shown in relation to FIG. 1.

However, as will be appreciated from FIG. 1, the exact orientation angle for a gradient is not required; instead there is typically only a requirement to assign the gradient for a pixel to a HOG orientation bin covering a range of angles.

Embodiments of the present invention provide a simple way of calculating in which one of a number of sectors a gradient orientation fits. While individual sectors could be used as HOG bins, it can be useful to combine sectors into orientation bins as will be explained in more detail below.

Figure 2:
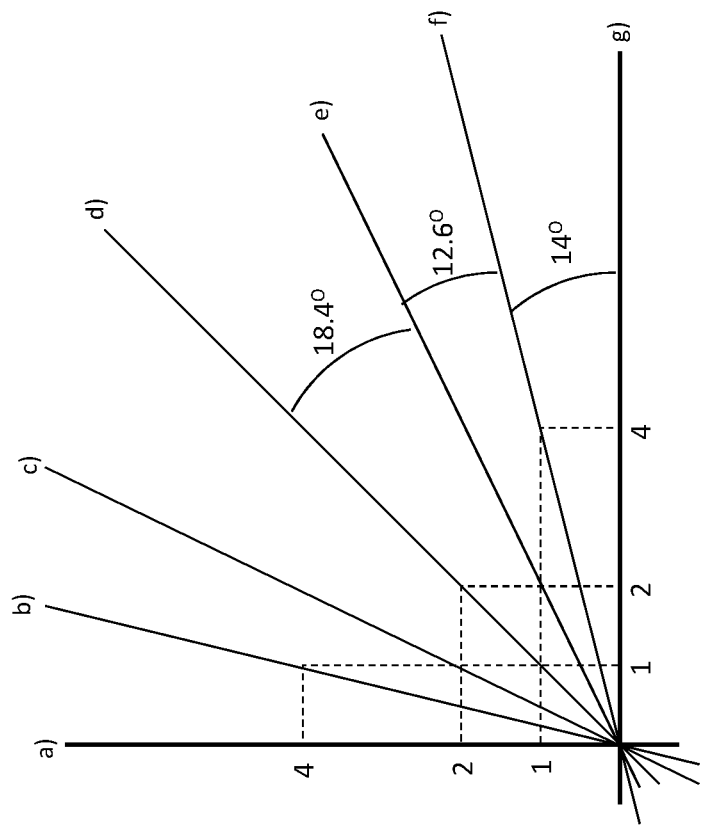
FIG. 2 shows a quadrant split into 6 unequal sectors according to an embodiment of the present invention.

Referring to FIG. 2, in the example, each of the four Cartesian quadrants are split into 6 sectors—one of which is shown. The boundaries between the sectors indicated by the radiating lines of FIG. 2 are defined by the following conditions:

a) gx=0; b) gx=4*gy; c) gx=2*gy; d) gx=gy; e) gy=2*gx; f) gy=4*gx; g) gy=0

As will be seen, the resulting sectors do not have the same angular size.

In order to determine in which sector a gradient lies, rather than calculating the angle for each gradient, a limited number of comparisons can be performed including:

1) gx>0;
2) gy>0;
3) |gx|>|gy|;
4) |gx|>2|gy| OR |gy|>2|gx|;
5) |gx|>4|gy| OR |gy|>4|gx|

These 5 tests can be combined into a mask to determine in which one of 24 sectors a given gradient lies. So if gx>0 the first bit of the mask is '1'; if gy>0 the second bit is '1' and so on.

Figure 3:
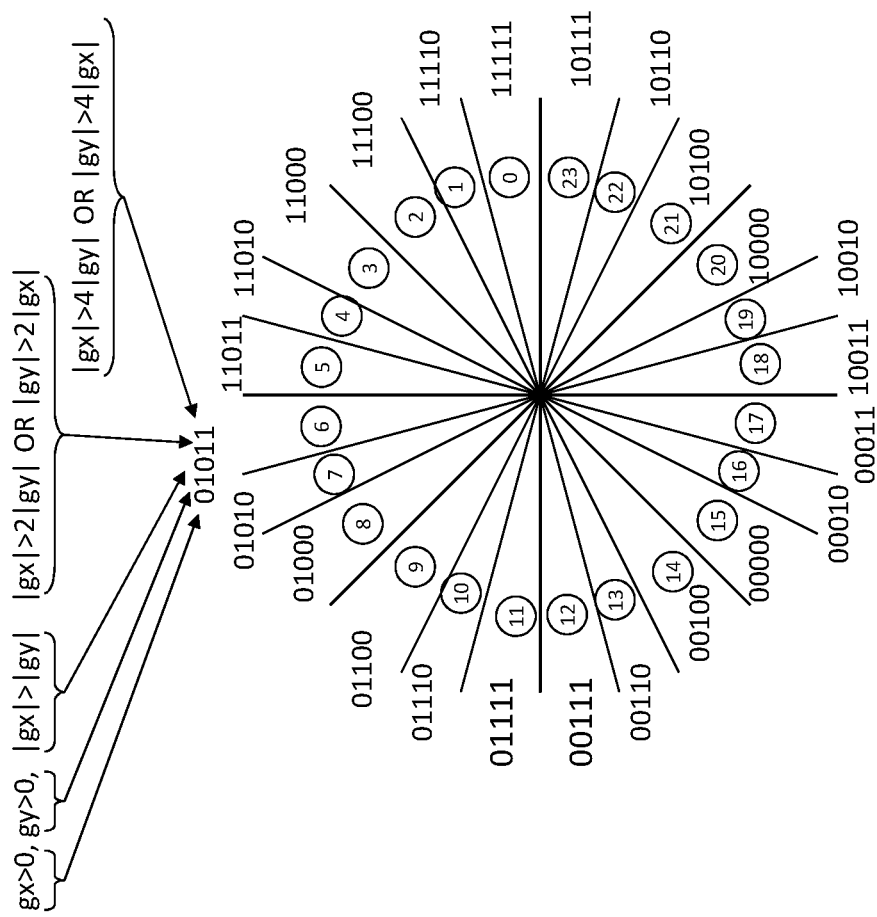
FIG. 3 illustrates a technique for determining in which of 24 sectors a gradient lies according to an embodiment of the present invention.

FIG. 3 shows the mask values for each sector 0-23.

So, for example, where gx>0, the gradient will lie in one of sectors 5-18; and if gy>0, such a gradient could only lie in one of sectors 5-0. If in this case, |gx|>|gy|, the possibilities are limited to sections 2-0; and so on until a specific sector is determined.

It will be seen from the above, that simple gate logic can be employed to clock through gx and gy values for a given pixel and to receive a gradient sector value for the pixel.

It will also be noted that as sectors are determined using powers of 2 of gx and gy, tests 4) and 5) listed above can be performed in hardware using bit shifted versions of gx and gy instead of requiring multiplication (or division).

It will be appreciated that a further level of granularity could be provided by adding a test: |gx|>8|gy| OR |gy|>8|gx|, however it is not thought that this would significantly improve results for most applications.

Equally, if for example, test 5 is not used, granularity would be reduced, as it would not be possible to discriminate between sectors 0,1; 4,5; 6,7; 10,11; 12,13; 16,17; 18, 19; and 22,23 in the example of FIG. 3. However, this could provide acceptable results for some applications.

Thus, in addition to or as an alternative to the x, y axes, the boundaries between sectors are defined by lines corresponding to $gx=2^n \cdot gy$. The situation where n=0 is the boundary employed in implementations such as classic Dalal et al referenced above whereas combinations of boundaries based on values of $|n| \geq 1$ provide for effective hardware implementation of binning as described in more detail below.

Implementations using the above approach can allow any combinations of sectors to form a bin, so that:

a bin can correspond to any number of sectors from 0 to 23;

the sectors in a bin do not have to be adjacent;

not all sectors must be part of a bin; and different bins can contain the same sector.

Figure 5:
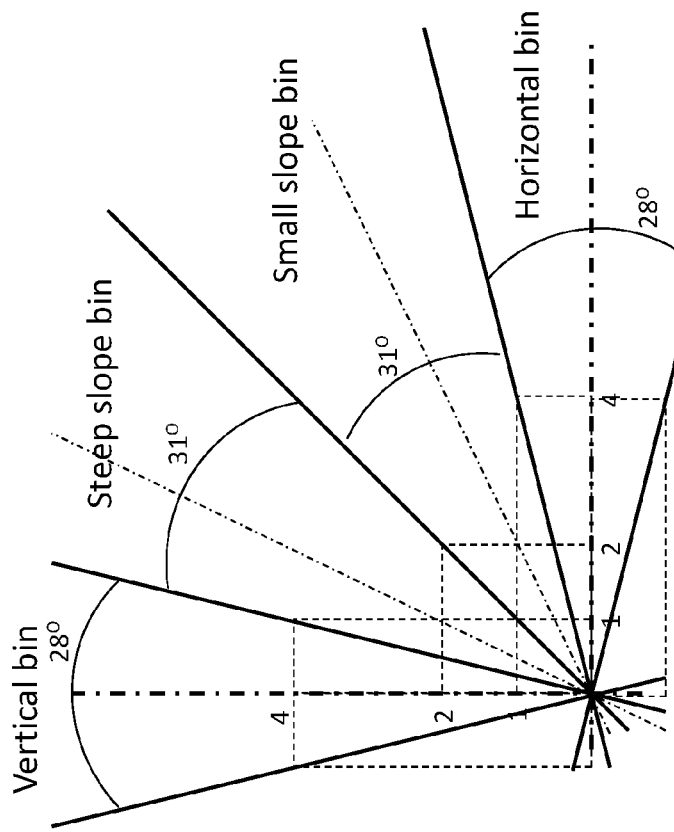
FIG. 5 illustrates one quadrant of another arrangement of sectors split according to FIGS. 2 and 3 and combined into 12 almost equal bins.
Figure 4:
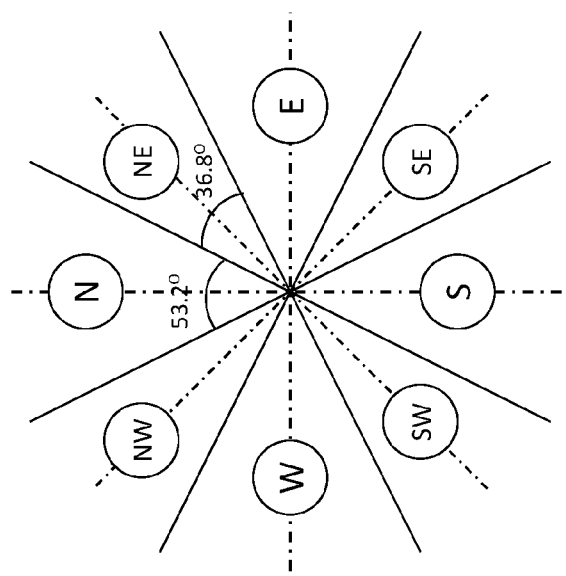
FIG. 4 illustrates an arrangement of sectors split according to FIGS. 2 and 3 and combined into 8 cardinal and inter-cardinal bins.

FIGS. 4 and 5 show exemplary bin configurations. In FIG. 4, sectors 4-7 have been combined to indicate a N(orth) gradient; sectors 8-9 have been combined to indicate a NW gradient; sectors 10-13 have been combined to indicate a W gradient and so on. FIG. 5 indicates that sectors can be combined into bins indicating different semantics such as horizontal, vertical, small slope or steep slope.

Figure 6:
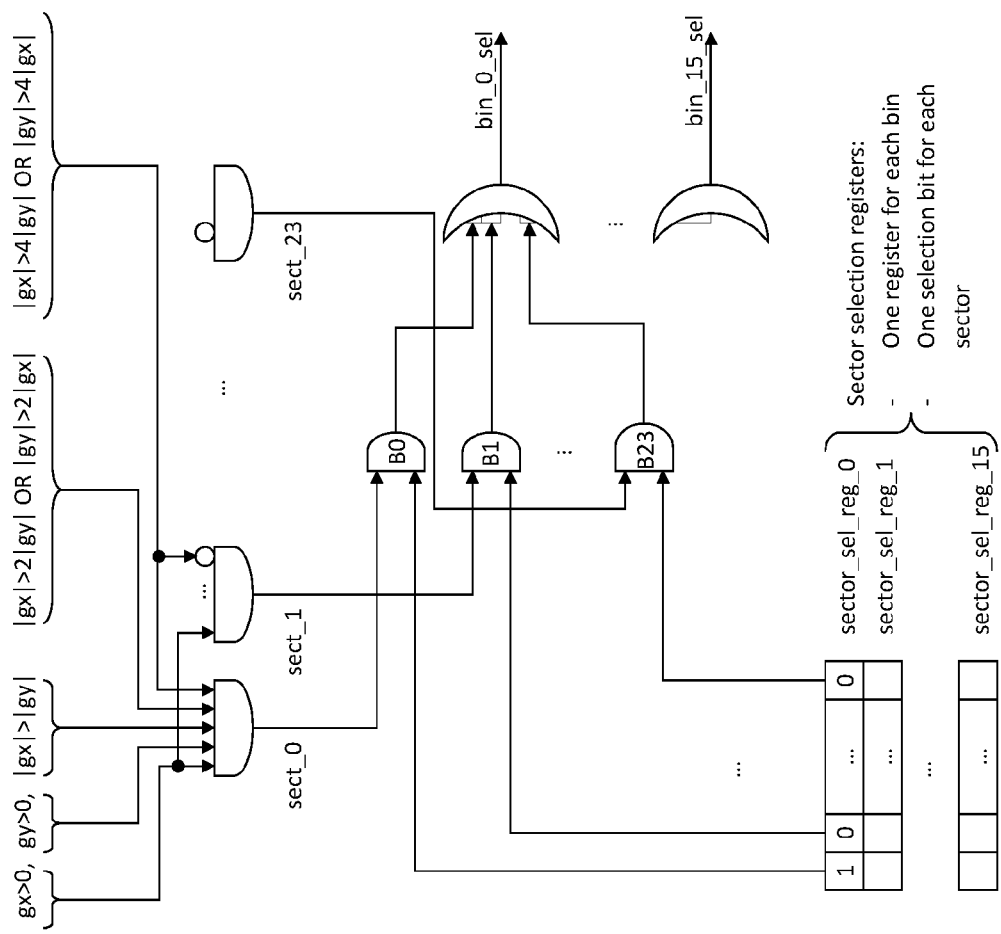
FIG. 6 illustrates exemplary logic for configurably combining sectors into bins.

FIG. 6 shows a hardware implementation where the tests 1) to 5) are implemented along with a configurable combination of sectors into any one or more of up to 16 bins. (The comparison logic for the tests and shifting logic for tests 4) and 5) is not shown.)

Thus, a 5 input AND gate output for sect_0 will be positive if all five tests are positive (11111 in FIG. 3); while the 5 input AND gate output for sect_1 will be positive if tests 1) to 4) are positive and test 5) negative (11110 in FIG. 3) and so on.

Each bin is defined with a respective 24 bit sector selection register comprising a mask defining the one or more sectors which combine to provide a given bin. For the sector selection register for bin_0_sel, each sector selection register bit is ANDed with the output of a corresponding 5 input AND gate providing the output for a sector in a set of AND gates B0 . . . B23 (only three of which are shown). The outputs of the AND gates B0 . . . B23 are combined in a common OR gate so that if a gradient falls in any configured sector of bin_0_sel configured according to sector_sel_reg_0, the OR gate output will indicate that the gradient for the pixel falls in that bin. The gates B0 . . . B23 are replicated for each bin from bin_0_sel to bin_15_sel and connect with the outputs of the 5 input AND gates and a respective sector selection register from sector_sel_reg_1 to sector_sel_reg_15.

Thus, for any given pixel, a 16 bit bin mask, bin_xx_sel, where xx=0 to 15, can be produced in the same clock cycle as gx and gy are presented to the logic.

At the same time the magnitude of the gradient could be simply calculated using Pythagoras theorem:

$$mag = \sqrt{gx^2 + gy^2}$$

However, the exact magnitude value is typically not essential for HOG calculation and usage. So in order to rationalise the hardware implementation, multipliers (and divisors) can be avoided by using the following approximation for gradient magnitude for a pixel:

$$mag=|gx|+|gy|-\min(|gx|,|gy|)/2$$

Thus, again for any clocked values of gx and gy, the magnitude of the pixel can be produced in the same clock cycle.

Figure 7:
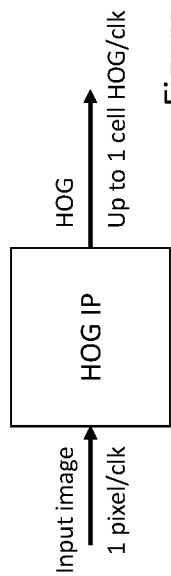
FIG. 7 shows a high level HOG image processing (IP) pipeline according to an embodiment of the present invention.

Referring now to FIG. 7, in one hardware implementation, a HOG image processing (IP) pipeline provides two main interfaces:

Input image interface, receiving one image pixel per clock cycle in raster order; and Output interface providing HOG descriptors for up to one cell per clock cycle, depending on the configured step between cells.

A typical clock frequency for such a module would be about 400 MHz.

Protocol wrappers can be provided for the input and output interface, to allow the HOG IP block to be connected to any kind of interface and system which might require HOG descriptors for an image or any rectangular portion of an image.

Equally, the HOG IP pipeline interface can enable features such as step size, cell size etc to be specified.

In general, the image processing pipeline splits an image or image portion into cells on the fly. Typically, an input image would be split into rectangular cells and HOG descriptors calculated for each cell.

The pipeline can work with any cell size. It has been found that 4×4 cells are a good choice and HOGs for such cells can be readily combined to provide HOGs for larger cells as will be explained later. While cell sizes less than 4 pixels wide or high might be regarded as too small to provide useful information, basing the hardware on a larger basic cell size than 4×4 would increase the gate count and the number of line buffers required. Where HOG descriptors provided for adjacent single cells are combined to provide HOG values for larger cells within an image, as described below, HOGs can be determined for larger cells, but without increasing gate count. It will also be appreciated that the steps from cell to cell can be configured. For example, a step of 1 on the horizontal and vertical directions means that a new HOG is produced at the HOG IP output interface every clock cycle (except when moving to a new row).

Hardware could also be arranged to support independent horizontal and vertical steps between cells. The hardware could in addition or alternatively be arranged so that HOG descriptors are provided for overlapping cells within an image (as would be the case for a 4×4 cell size with a step size of 1 or 2).

We would remark that a step size larger than the cell size is typically not useful. Also, a step size of 3 is typically not required and supporting such a step size would also lead to more complicated hardware implementations.

Figure 8:
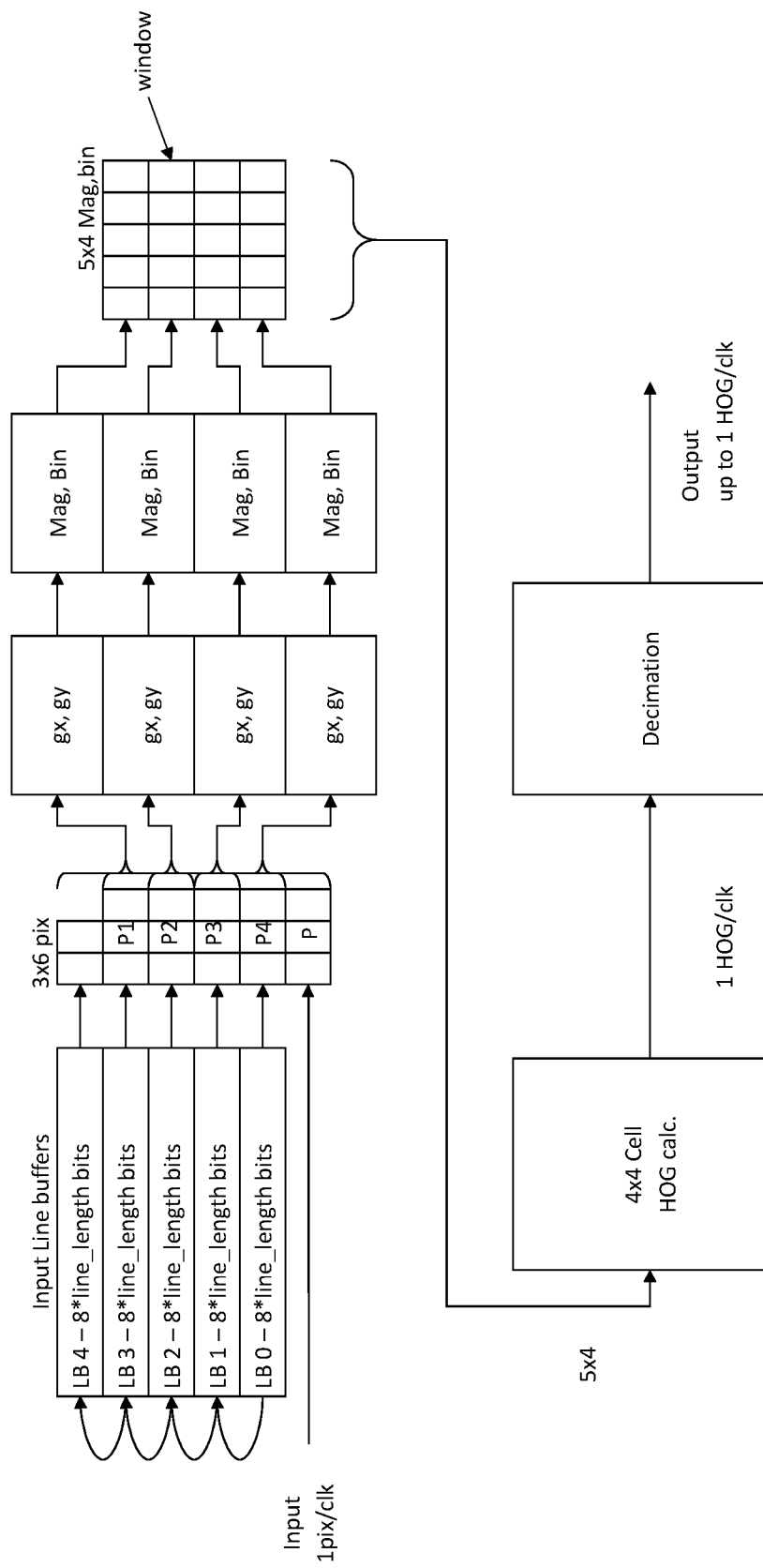
FIG. 8 illustrates an internal architecture of a hardware implementation of the HOG IP of FIG. 7 with a block of four line buffers.
Figure 9:
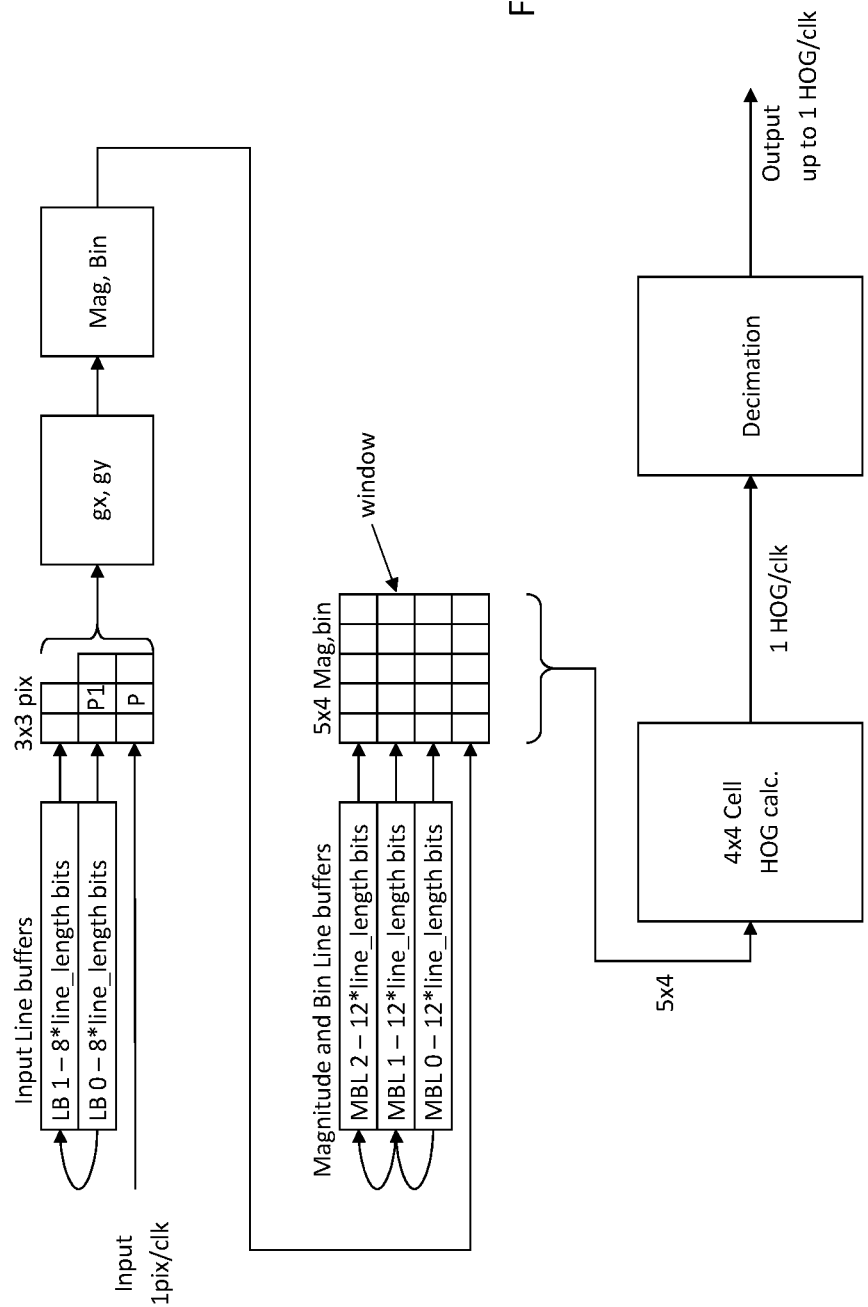
FIG. 9 illustrates an internal architecture of a hardware implementation of the HOG IP of FIG. 7 with a block of two line buffers.

In any case, FIGS. 8 and 9 illustrate two exemplary hardware implementations of the HOG IP of FIG. 7. Both implementation use the same sub-blocks of logic, but differ in the way line buffers are arranged. The implementation of FIG. 8 requires less memory for line buffering, but needs more logic gates (25 KGates for FIG. 8 as distinct from 20 KGates for FIG. 9). In FIG. 8, all line buffers can be grouped into a contiguous region of RAM whereas in the implementation of FIG. 9 two separate sets of line buffers are employed.

Turning to FIG. 8, in this case, an input line buffer including pixels values from 5 previous rows LB0 . . . LB5 is read sequentially into memory one pixel at a time.

Recalling that a border pixel of 1 is required for the kernels shown in FIG. 1, once the first 5 lines of data have been read into memory, as the $6^{th}$ line is being read, HOG descriptors for a first swath of 4×4 cells of the image corresponding to rows 2-5 can be calculated using the simple [−1, 0, 1] horizontal and vertical differentiation kernels of FIG. 1.

As each pixel P in the $6^{th}$ row is read, the horizontal and vertical gradient components gx,gy can be provided for the corresponding pixels P1 . . . P4 in the previous 4 rows of the image i.e. rows which are displaced by n*pixel_columns, where n=1 . . . 4, from the pixel P within the line buffer.

Using the circuitry of FIG. 7 and the calculation for magnitude explained above, the (16 bit) bin mask and magnitude based on these values of gx,gy for pixels P1 . . . P4 is immediately available and this is shifted into a 5×4 windowed buffer which maintains the values for 5 columns of the image.

As each pixel for a row is clocked in through the HOG IP input interface, a set of 4 bin masks and magnitudes is shifted into a column of the 5×4 windowed buffer with the previous values shifted out.

A Cell HOG calc block comprises a counter circuit which tallys the count for each bin for each pixel comprising a 4×4 set of cells read from the 5×4 windowed buffer. This can be done by simply adding the corresponding bits of each of the 16 bin_xx_sel registers generated using the circuitry of FIG. 7.

Thus, the Cell HOG calc block produces an array of 16 counts for each of configured bin_0 to bin_15 for each clock cycle.

Figure 10:
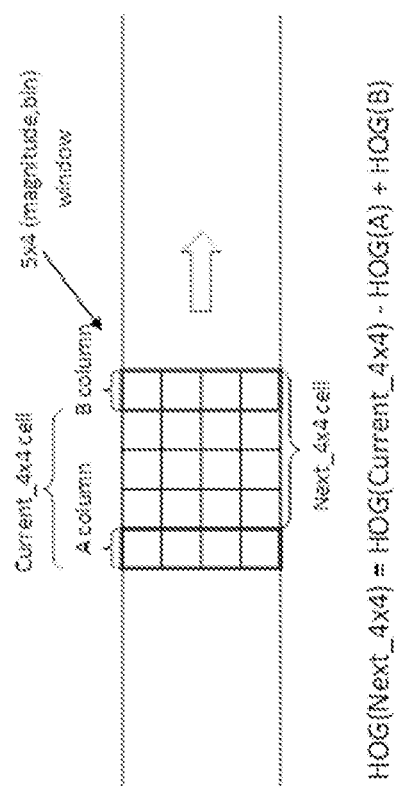
FIG. 10 illustrates windowing for successively determining respective HOGs for cells in a swath of an image.

Referring to FIG. 10, a particularly useful approach using the 5×4 windowed buffer is for the Cell HOG calc block to subtract values from the oldest column A of the 5×4 windowed buffer and add the values for the newest column B of the 5×4 windowed buffer to the previous values of a 4×4 set of cells read from the 5×4 windowed buffer to obtain the current HOG at each clock cycle. This allows the Cell HOG calc block to be hardwired to the windowed buffer and to provide a HOG on each clock cycle without shifting or switching.

Referring back to FIG. 8, an array comprising the counts for each of the 16 bins comprising the HOG is provided to a decimation block on each clock cycle.

The decimation block reduces the frequency of HOGs produced, according to the horizontal and vertical steps. So for example with a horizontal step size of 4, the HOG IP output interface would only produce a new HOG or update the HOG every fourth clock cycle.

It will also be appreciated that for a horizontal and vertical step size of 4, once a given swath of an image is completed, 3 new lines of the image will need to be read, before on the $5^{th}$ pixel of next line, the next HOG becomes available.

In the case of FIG. 9, the input line buffer only includes pixels values from 2 previous rows LB0 and LB1 and so when a pixel P is being read, only the horizontal and vertical gradient components for a corresponding pixel P1 from the previous line can be determined.

In this case, each newly calculated value of magnitude and bin mask for the pixel P1 is shifted into a 5×4 windowed buffer one at a time (rather than 4 at a time in FIG. 8). As the values of magnitude and bin mask for the previous 3 lines of the image are shifted out of this buffer, they are stored in a second set of Magnitude and Bin Line buffers MBL0 . . . MBL2, so that as the process advances row by row through an image, the magnitude and bin mask values from the previous 3 lines are always available for calculating a HOG for a 4×4 cell. (The memory required for each Magnitude and Bin Line buffer MBL0 . . . MBL2 is greater than for the line buffers LB0 . . . LB1 (and indeed LB2 . . . L4) because for each pixel both the gradient magnitude and bin mask need to be stored.) Nonetheless, for a given set of values in the 5×4 windowed buffer, the process and circuitry of FIG. 9 is as per FIG. 8.

For simplicity, neither FIG. 8 or 9 illustrate the processing of the magnitude values available in the 5×4 windowed buffer—these can be read as required through the HOG IP output interface when the HOG values for a cell are being read to provide a complete set of HOG descriptors for a cell.

It will be appreciated that using the above described implementations the HOG values for corresponding bins of adjacent 4×4 cells can simply be added to provide HOG values for larger cells within an image. Thus, with one pass over an image, an application can perform top down or bottom up analysis of gradient as required.

Many variants of the above described embodiments are possible.

For example, the magnitude values for a bin corresponding to all 24 sectors could be used to give a general idea about how steep the gradients in the cell are and can be used for scaling for example.

Figure 11:
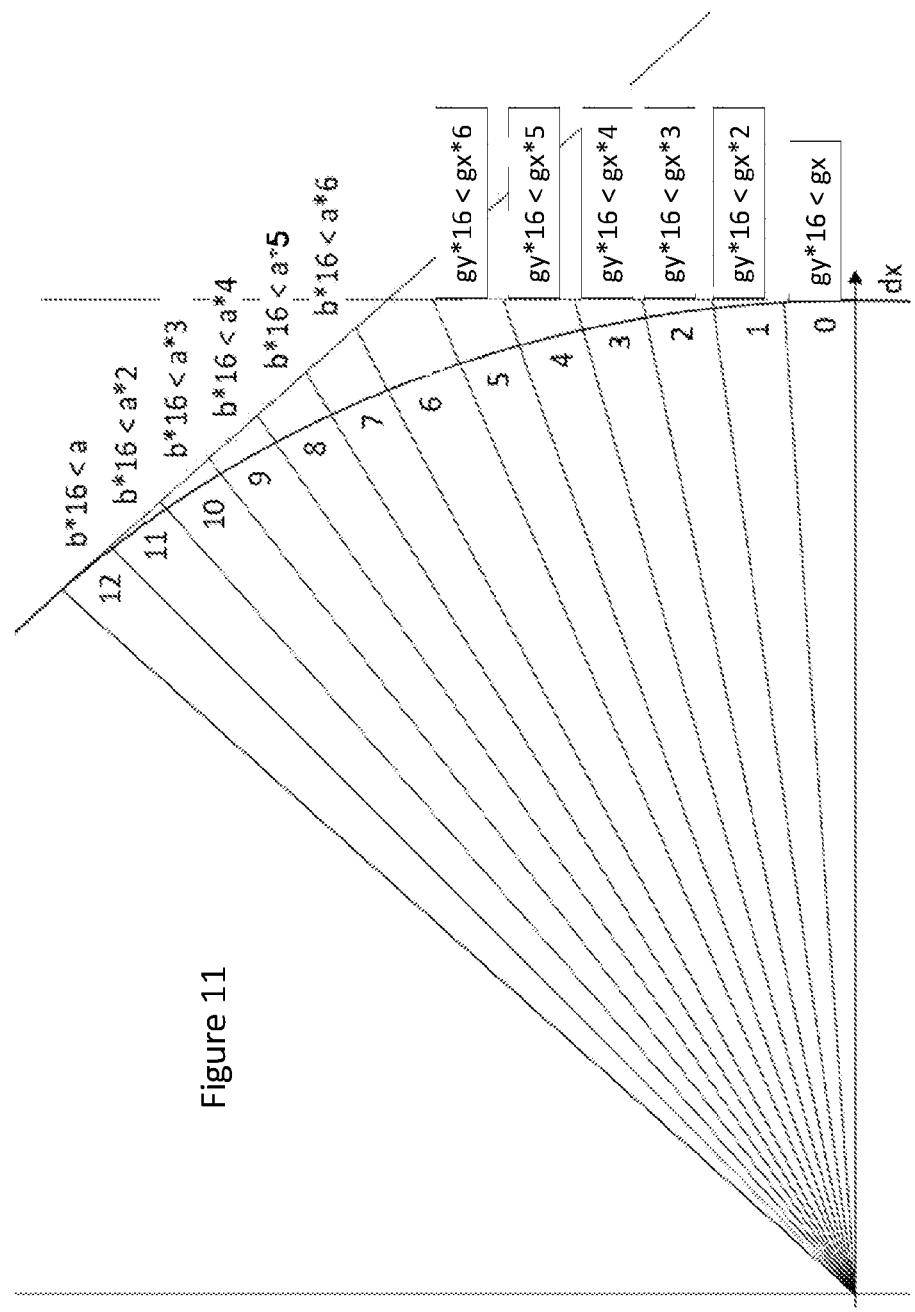
FIG. 11 shows a half-quadrant split into 13 unequal sectors according to a further embodiment of the present invention.

Referring now to FIG. 11, in a variant of the above described embodiment, instead of dividing sectors along the lines $gx=2^n \cdot gy$, sectors are divided according to the inequality $b*16<a*(n+1)$, where n is a sector index. For n=0 . . . 5, b=gy and a=gx and this produces a set of sectors with boundaries as follows:

| Sector number (n) | Sector border (degrees) | Sector Size (degrees) |
| --- | --- | --- |
| 0 | 3.58 | 3.58 |
| 1 | 7.13 | 3.55 |
| 2 | 10.62 | 3.49 |
| 3 | 14.04 | 3.42 |
| 4 | 17.35 | 3.32 |
| 5 | 20.56 | 3.20 |

It will be seen that as n increases, the size of each sector decreases from 3.58 to 3.20 degrees—however this is within approximately a 10% variation in size of sector. If n were to be extended to cover a half-quadrant, then 16 sectors would be required, with the last having a range of only 1.85° and this would involve too great a variation in sector size.

In the embodiment, by rotating the axis by 45°, we can test a gradient for sectors n=12 down to n=7. Rotating the axis by 45° can be done as follows:

$a=gx+gy;$ $b=gx-gy;$

The resulting sector boundaries are as follows:

| Sector number(n) | Sector border (degrees) | Sector Size (degrees) |
| --- | --- | --- |
| 12 | 41.42 | 3.58 |
| 11 | 37.87 | 3.55 |
| 10 | 34.38 | 3.49 |
| 9 | 30.96 | 3.42 |
| 8 | 27.65 | 3.32 |
| 7 | 24.44 | 3.20 |

Sector 6 is the remaining space between sectors 0 . . . 5 and 7 . . . 12 and has a range of 3.89°—still within 10% of the average range.

An algorithm for determining if a gradient lies in any of sectors 0 . . . 12 of a half-quadrant is as follows:

```
int a = gx + gy;
int b = gx - gy;
if(gy*16 < gx*1)sector = 0; else
if(gy*16 < gx*2)sector = 1; else
...
if(gy*16 < gx*6)sector = 5; else
if(b*16 < a*1)sector = 12; else
if(b*16 < a*2)sector = 11; else
...
if(b*16 < a*6)sector = 7; else
sector = 6;
```

As indicated above, multiplication by 16 can be performed in hardware with a simple shift while multiplication by 1-6 can be performed with simple shifts and in some cases additions—as such the above algorithm can be readily implemented in hardware providing outputs in a similar fashion to the test of FIG. 6. Note that for n=4 and n=9, the same boundaries are employed as in the embodiment of FIGS. 2-6 and these require only shifts and comparisons as in FIGS. 2-6.

Figure 13:
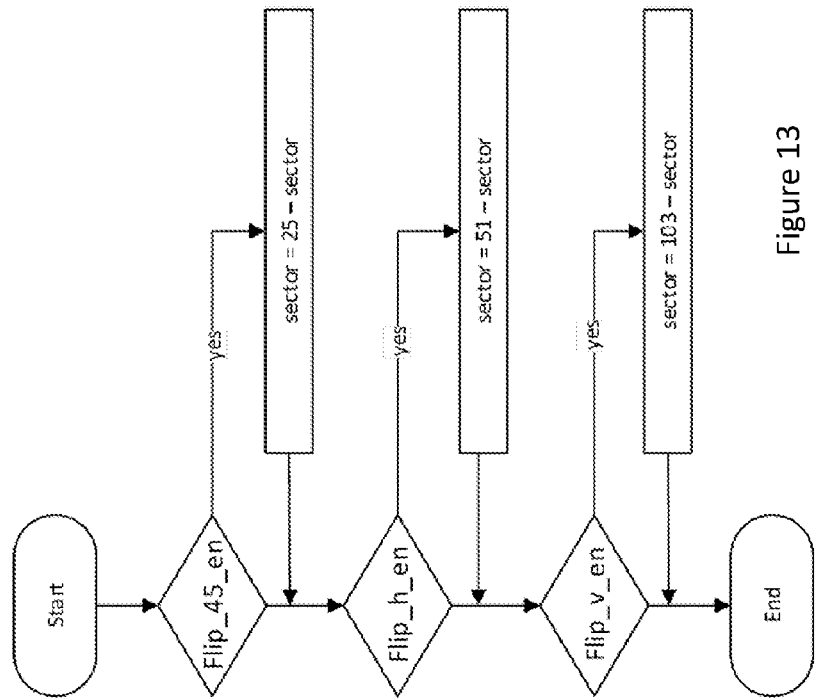
FIG. 13 illustrates a method for mapping sector values from a half-quadrant back to sector values for a full circle.
Figure 12:
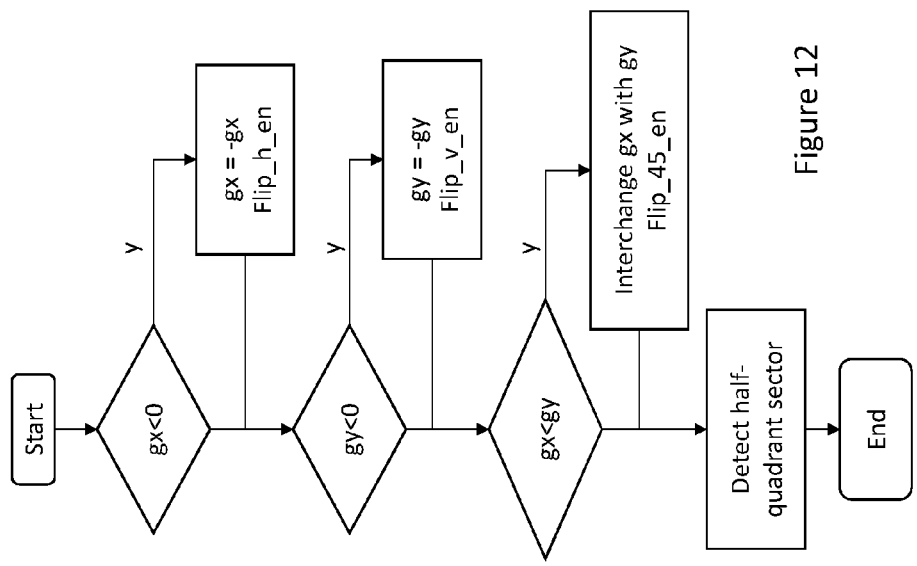
FIG. 12 illustrates a method for mapping gradients for a full circle to a half-quadrant according to a further embodiment.

The above approach can be extended to cover the entire circle, by reducing the calculations for all half-quadrants to those for the first half-quadrant (0°-45°) as illustrated in FIGS. 12 and 13.

FIG. 12 begins by determining if gx<0 for a pixel and if so, its gx polarity is reversed and a horizontal flip enabled bit for the pixel is set. Following this test, the method tests if gy<0 and if so, its gy polarity is reversed and a vertical flip enabled bit is set. Finally, if gx<gy, these values are interchanged and a flip 45° enabled bit is set. Note that each of the 3 flip bits can be set independently. The method continues by applying the algorithm above to determine in which half-quadrant sector 0 . . . 12 the processed gx, gy values for a pixel lie. Note that within the half-quadrant algorithm above, the processed gx, gy values are again translated to provide the values for a,b.

The eight half-quadrants of the circle each comprise 13 sectors and FIG. 13 shows how the 0 . . . 12 index returned by the half-quadrant sector algorithm can be extended to produce an index ranging from 0 . . . 103.

Figure 14:
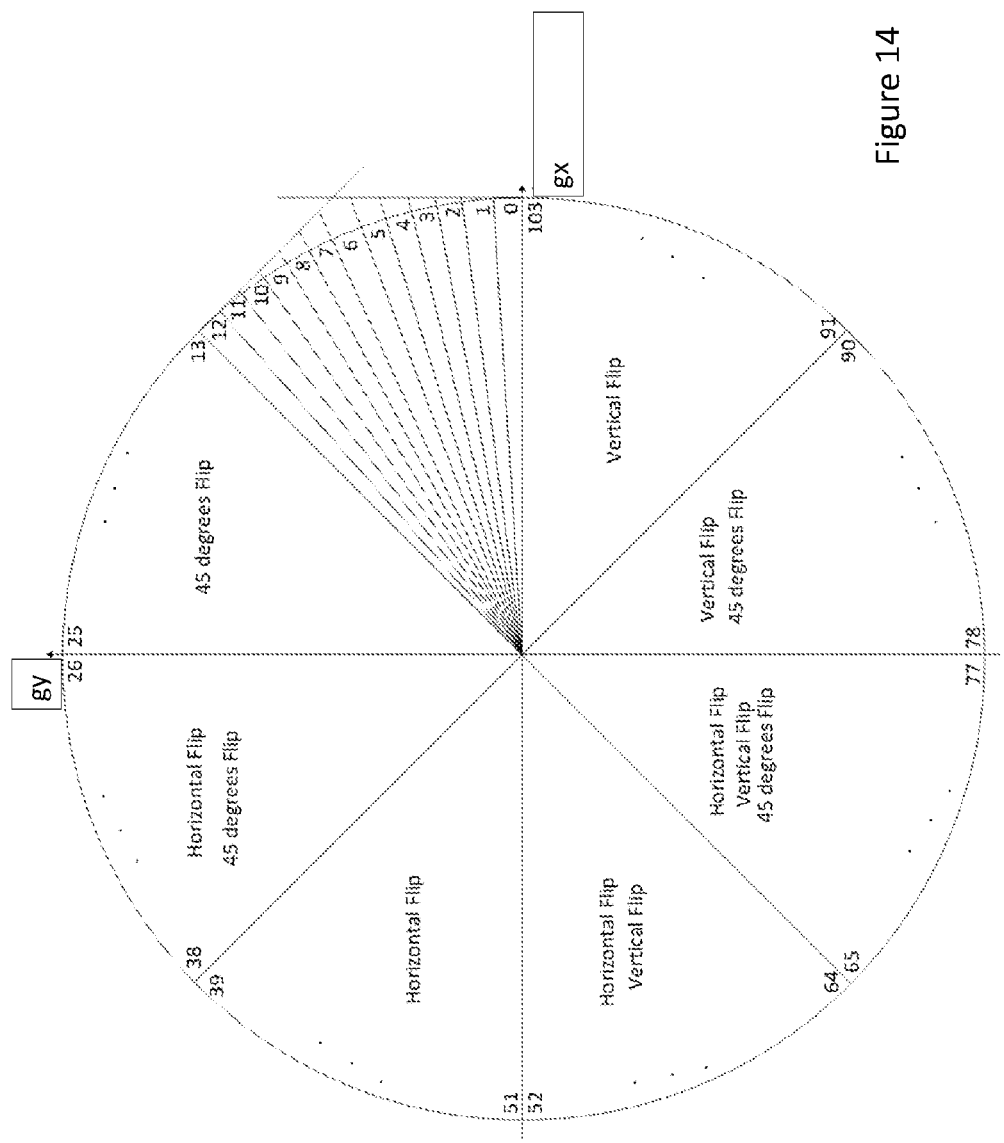
FIG. 14 shows a full circle split into 104 unequal sectors according to a further embodiment of the present invention.

Thus, if the flip 45° enabled bit the sector value 0 . . . 12 is subtracted from 25 to produce a first processed value. Thus the first processed value will range from 0 . . . 25. If the horizontal flip bit is enabled, the first processed value is subtracted from 51 to produce a second processed value which can thus range from 0 . . . 51. Finally, if the vertical flip bit is enabled, the second processed value is subtracted from 103 to produce a final processed value which can thus range from 0 . . . 103. The full circle representation, containing all 104 sectors is shown in FIG. 14.

It will be seen that the above algorithm and the methods of FIGS. 12 and 13 can be readily implemented in hardware with simple comparisons and switches to map any pixel gradient to any one of 104 sectors with rationalised hardware and minimal latency.

The sector to bin mapping architecture of FIG. 6 can be extended to map the 104 sector outputs to any number of bins for use in determining the HOG for a cell. However, when 104 sectors are employed, it can be simpler to employ a lookup table with 104 entries mapping each sector to one of a number of bins. For example, the sectors could be mapped to 16 HOG bins as follows:

| HOG Bin | Sectors | Bin degrees |
|---|---|---|
| 0 | 0 ... 6 | 24.45 |
| 1 | 7 ... 12 | 20.56 |
| 2 | 13 ... 18 | 20.56 |
| 3 | 19 ... 25 | 24.45 |
| 4 | 26 ... 32 | 24.45 |
| 5 | 33 ... 38 | 20.56 |
| 6 | 39 ... 44 | 20.56 |
| 7 | 45 ... 51 | 24.45 |
| 8 | 52 ... 58 | 24.45 |
| 9 | 59 ... 64 | 20.56 |
| 10 | 65 ... 70 | 20.56 |
| 11 | 71 ... 77 | 24.45 |
| 12 | 78 ... 84 | 24.45 |
| 13 | 85 ... 90 | 20.56 |
| 14 | 91 ... 96 | 20.56 |
| 15 | 97 ... 103 | 24.45 |

In another example, the sectors are mapped to 9 HOG bins as follows:

| HOG Bin | Sectors | Bin degrees |
|---|---|---|
| 0 | 0 ... 11 | 41.43 |
| 1 | 12 ... 23 | 41.46 |
| 2 | 24 ... 34 | 38.1 |
| 3 | 35 ... 45 | 38.49 |
| 4 | 46 ... 57 | 41.12 |
| 5 | 58 ... 69 | 41.81 |
| 6 | 70 ... 80 | 38.27 |
| 7 | 81 ... 92 | 41.52 |
| 8 | 93 ... 103 | 37.88 |

In each of these examples, the variation in bin size can be maintained within 10% of average.

In another variation of the above embodiments, the magnitude m(x,y) of the gradient for a pixel can be calculated based on the formula:

$$m(x, y) = \frac{1}{\cos(\alpha)} Gx(x, y)$$

It will be appreciated that inside a sector whose range is less than 4° as in the case of embodiment such as described in relation to FIGS. 11-14, magnitude varies very little. Within the 13 sectors which make up the first half-quadrant for 0-45°, we can calculate and store measures for the mid-angle of the sector, for example, 1.788° for sector 0, 5.3506° for sector 1 etc. For angles between 0° and 45°, the 13 sector values for $$\frac{1}{\cos(\alpha)}$$

will be between 1 and 1.372.

If we multiply these by 256, we can store the integer results in a look-up table comprising only integer numbers between 256 and 351 as follows:

| Sector no. | $K = \frac{256}{\cos(\alpha)}$ |
|---|---|
| 0 | 256 |
| 1 | 257 |
| 2 | 259 |
| 3 | 262 |
| 4 | 266 |
| 5 | 271 |
| 6 | 277 |
| 7 | 285 |
| 8 | 294 |
| 9 | 304 |
| 10 | 317 |
| 11 | 332 |
| 12 | 351 |

Now magnitude can be calculated as:

$$m(x, y) = \frac{K * Gx(x, y)}{256}$$

As will be appreciated this calculation requires only a single multiplication and some shifts.

In the above described embodiments, no matter where a gradient for a pixel lies within a sector or where the sector lies within a bin, the contribution of the pixel's gradient to the final HOG will be the same i.e. a pixel either lies within a sector/bin or not. In some applications better results can be obtained if the contribution of the pixel's gradient is divided between two adjacent bins.

In such an embodiment, rather than a bin extending across a range of angles, each bin is associated with a specific angle. Thus, for the boundary angles of FIG. 2, bin 0 to bin 6 might be associated with angles g) to a) respectively and so on for the bins of the remaining quadrants. For the 16 HOG bin arrangement of the table above, each of bin 0 to bin 15 would correspond with angles 0°, 24.45°, 45°, 70.65° etc respectively. Similarly, each sector is associated with a specific angle rather than a range of angles, so in the embodiment of FIGS. 11 to 14, each sector would be associated with one of 104 discrete angles.

Figure 15:
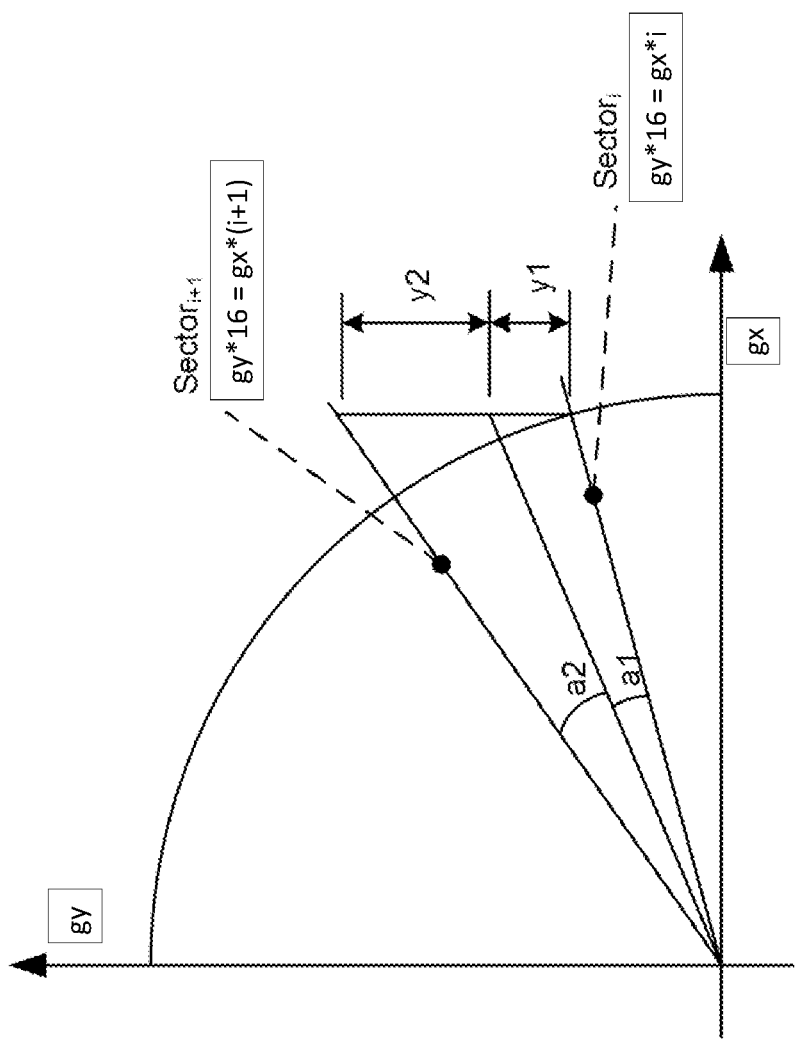
FIG. 15 illustrates how to determine weights for a pixel gradient vector lying between two sectors according to a further embodiment of the invention.

In one embodiment, in order to weight the gradient for a pixel across 2 adjacent bins, we need to consider the particular angular position of the gradient for the pixel relative to the angles of the sectors between which it lies. Referring to FIG. 15, take for example, $sector_i$ and $sector_{i+1}$ separated by gy*16/gx degrees. Here, the gradient weight W0 for $sector_i$ and the weight W1 for $sector_{i+1}$ for a pixel gradient in a sector between the bins can be defined as follows:

$$W0 = \frac{a2}{a1 + a2}$$

$$W1 = \frac{a1}{a1 + a2} = 1 - W0$$

where a1 and a2 are the intra-sector angles of the gradient.

Thus, the larger the angle a1 relative to a2, the closer a pixel gradient is to $sector_{i+1}$ than to $sector_i$ and the heavier its weighting towards $sector_{i+1}$ by comparison to $sector_i$ will be.

For small angles at least in the first half quadrant, where for angles between 22.5° and 45° calculations are performed by rotating the axis by 45°, we can approximate $$\frac{a1}{a1+a2} \text{ as } \frac{y1}{y1+y2}.$$

Since the boundaries for sectors are separated by a constant gy*16/gx degrees, gy=y1+y2=gx/16, we can compute W1 as:

$$W1 = \frac{gy(x,y)}{\frac{gx(x,y)}{16}}$$

As will be appreciated performing the above divisions would difficult for every pixel gradient. Thus, in one embodiment the values of $$\frac{1024}{\frac{Gx(xy)}{16}},$$

which vary between b4 and 1024 are stored in a look-up table (LUT). Note that while gx(x, y) is between 0 and 255, the integer approximation $$\frac{gx(x,y)}{16}$$

varies between 0 and 15, as such the LUT only needs to store 16 values (Kw) to provide the approximation.

Weights W1, W0 for pixel gradients between $sector_{i+1}$ and $sector_i$ can then computed as:

$$W1 = \frac{gy(x,y) * Kw}{1024} = 1 - W0$$

So we can compute weights for interpolations using a LUT storing 16 values and one multiplier. Clearly if sector separations different than shown in FIG. 15 are employed, the LUT values and indices would change accordingly.

Figure 16:
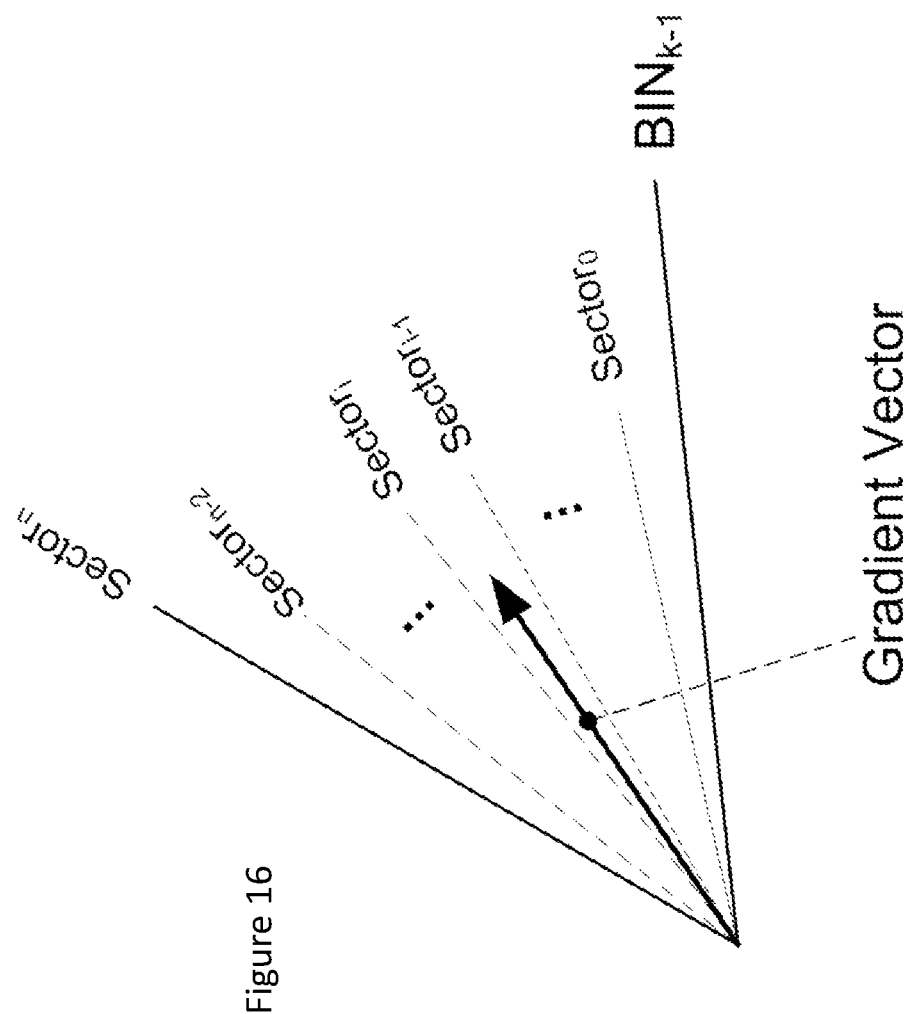
FIG. 16 illustrates how to map weights for a pixel gradient vector determined according to FIG. 15 to a boundary bin.

Referring to FIG. 16, which illustrates how to map a weight from a pixel gradient lying within any of a number of sectors from $Sector_0$ to $Sector_n$ associated with $BIN_{k-1}$ (and $BIN_k$) to the bin(s). The weight of the pixel gradient relative to the bins between which it falls can be calculated with the following formula:

$$W_{BIN} = \frac{W_i + i}{n}$$

Where:
n—The number of sectors between the bins;
i—The index of the (lower) sector between the bins where the pixel gradient lies;
$W_i$—The weight (W1) for the bin calculated for sector i;
$W_{Bin}$—The resulting weight of the gradient relative to the $bin_{k-1}$. The weight for $bin_k$ would be $1-W_{Bin}$.

Thus a pixel gradient lying mid-way between the mid-sectors between two bins would contribute half its weight to one boundary bin and half its weight to the other. The closer the pixel gradient is to one boundary bin, the greater weight it will contribute to that boundary bin.

Once determined, the weights ($W_{Bin}$, $1-W_{Bin}$) from each pixel gradient determined for each of its boundary bins can be accumulated to provide the HOG for a cell.

Note that where the above weighting technique is implemented with methods such as described in relation to FIGS. 12-14 where half-quadrants are flipped into the first half-quadrant, then the weights calculated for each pixel gradient ($W_{Bin}$, $1-W_{Bin}$) need to be flipped accordingly.

It will be seen that by employing the above described techniques and approximations, the above described embodiments illustrated in FIGS. 11-16 can be implemented with hardware of similar complexity to that illustrated in FIGS. 6-9.

The invention claimed is:

1. A method for producing a histogram of oriented gradients (HOG) for at least a portion of an image comprising:
dividing said image portion into cells, each cell comprising a plurality of image pixels;
for each image pixel of a cell,
obtaining a horizontal gradient component, gx, and a vertical gradient component, gy, based on differences in pixel values along at least a row of said image and a column of said image respectively including said pixel; and
allocating a gradient to one of a plurality of sectors, each sector extending through a range of orientation angles and at least some of said sectors being divided from adjacent sectors along lines including gx=$2^n$·gy, where n is any integer value with a magnitude greater than or equal to 1, said allocating a gradient to a sector being divided from an adjacent sector along a line including gx=$2^n$·gy using only shift and comparison logic;
associating at least one sector with a bin; and
accumulating each instance of a pixel gradient of a cell associated with a bin to provide a HOG for said cell.

2. A method according to claim 1 further comprising, for each image pixel of a cell, calculating a magnitude of said gradient.

3. A method according to claim 2 comprising said calculating said magnitude according to the formula:

$$mag=|gx|+|gy|-\min(|gx|,|gy|)/2.$$

4. A method according to claim 1 wherein said sectors are divided from adjacent sectors along the following lines: gx=0; gx=4*gy; gx=2*gy; gx=gy; gy=2*gx; gy=4*gx; and gy=0.

5. A method according to claim 1 wherein each cell comprises 4×4 image pixels.

6. A method according to claim 1 wherein each cell is displaced by steps of one of 1, 2 or 4 pixels vertically or horizontally from an adjacent cell.

7. A method according to claim 1 wherein said obtaining a gradient component comprises subtracting a pixel value for a first pixel immediately adjacent a pixel from a pixel value for a second pixel immediately adjacent said pixel and opposite said first pixel.

8. A method according to claim 1 comprising associating at least one bin with a plurality of sectors.

9. A method according to claim 8 wherein said sectors are either adjacent or non-adjacent.

10. A method according to claim 8 wherein a plurality of bins are associated with a given sector.

11. A method according to claim 8 wherein not all sectors are associated with a bin.

12. A method according to claim 1 comprising associating each sector with a respective bin.

13. A method according to claim 1 wherein said pixel values are intensity values.

14. A method according to claim 1 wherein said pixel values are colour values.

15. A method according to claim 1 further comprising the step of combining respective HOGs for a plurality of adjacent cells.

16. A method according to claim 1 further comprising:
calculating a magnitude m(x, y) for each pixel gradient according to the formula:

$$m(x, y) = \frac{K * gx(x, y)}{c}$$

where K comprises a look-up table of integer value approximations for $\cos(\propto)$ indexed using an allocated sector index, where $\cos(\propto)$ is an angle corresponding to each sector index and where c is a constant and a power of 2.

17. An image processing system including digital logic for implementing the method of claim 1.

18. An image processing system according to claim 17 wherein said logic includes a plurality of line buffers and wherein said logic is arranged to receive an image pixel-by-pixel on each cycle of a clock and to accumulate previous pixel values in said line buffers.

19. An image processing system according to claim 18 wherein said logic is arranged to produce said horizontal and vertical gradient components for one or more pixels stored in said line buffers in the same column of an image as a currently received pixel.

20. An image processing system according to claim 19 wherein said logic includes a buffer arranged to accumulate indicators for which bins each pixel of a cell is associated with.

21. An image processing system according to claim 20 wherein said logic comprises a counter connected to said buffer for providing said count of pixel gradients of a cell associated with respective bins.

22. An image processing system according to claim 21 wherein said logic is arranged to provide said count synchronously in multiple steps of said clock cycle.

23. An image processing system according to claim 17 including logic for combining tests for whether a gradient for a pixel lies within the boundaries of any of said sectors.

24. An image processing system according to claim 23 wherein said tests comprise:

$gx>0; gy>0; |gx|>|gy|; |gx|>2|gy|$ OR $|gy|>2|gx|;$
and $|gx|>4|gy|$ OR $|gy|>4|gx|.$ 25. An image processing system according to claim 23 wherein said logic for combining tests is replicated for each sector.

26. An image processing system according to claim 23 including logic for combining said test results with respective bin configurations, each bin configuration associating a bin with a combination of said sectors, to provide a bin mask indicating any configured bins in which said gradient lies.

27. An image processing system including digital logic for producing a histogram of oriented gradients (HOG) for respective cells from at least a portion of an image, each cell comprising a plurality of image pixels,
said logic including a plurality of line buffers and being arranged to receive an image pixel-by-pixel on each cycle of a clock and to accumulate previous pixel values in said line buffers,
said logic being arranged to produce a horizontal gradient component, gx, and a vertical gradient component, gy, for one or more pixels stored in said line buffers from the same column of an image as a currently received pixel based on differences in pixel values along at least a row of said image and a column of said image respectively including said one or more pixels,
said logic being arranged to allocate respective gradients for said one or more pixels to one of a plurality of bins, each bin extending through a range of orientation angles, said logic including a buffer arranged to accumulate indicators for which bins each pixel of a cell is associated with, and
said logic including a counter connected to said buffer for providing a count of pixel gradients of a cell associated with respective bins, said logic being arranged to provide said count synchronously in multiple steps of said clock cycle according to cell displacement.

28. An image processing system according to claim 27 wherein said logic for allocating respective gradients includes logic for testing if:

$gx>0; gy>0; |gx|>|gy|; |gx|>2|gy|$ OR $|gy|>2|gx|;$
and $|gx|>4|gy|$ OR $|gy|>4|gx|.$ 29. A method for producing a histogram of oriented gradients (HOG) for at least a portion of an image comprising:
dividing said image portion into cells, each cell comprising a plurality of image pixels;
for each image pixel of a cell,
obtaining a horizontal gradient component, gx, and a vertical gradient component, gy, based on differences in pixel values along at least a row of said image and a column of said image respectively including said pixel; and
allocating a gradient to one of a plurality of sectors, where n is a sector index, each sector extending through a range of orientation angles and at least some of said sectors being divided from adjacent sectors according to the inequalities: $b*16<a*(n+1)$ where $0 \leq n \leq 5$, b=gy and a=gx; and $b*16<a*(13-n)$ where $7 \leq n \leq 12$, a=gx+gy and b=gx−gy;
associating at least one sector with a bin; and
accumulating each instance of a pixel gradient of a cell associated with a bin to provide a HOG for said cell.

30. A method according to claim 29 comprising: prior to allocating a pixel gradient to one of a plurality of sectors:
reversing the horizontal gradient component, gx of a pixel if the horizontal gradient component is less than 0;
reversing the vertical gradient component, gy of a pixel if the vertical gradient component is less than 0; and
interchanging the horizontal and vertical gradient components of a pixel if the vertical gradient component is greater than the horizontal gradient component in order to map pixel gradients to a common half-quadrant; and
after allocating a pixel gradient to one of a plurality of sectors:
mapping said allocated sector to a sector of a full circle according to said reversing and interchanging.

31. A method according to claim 29 wherein associating a sector with bin comprises using an allocated sector index n as an index for a look up table.

32. A method according to claim 29 further comprising: calculating a magnitude m(x, y) for each pixel gradient according to the formula:

$$m(x, y) = \frac{K * gx(x, y)}{c}$$

where K comprises a look-up table of integer value approximations for $\cos(\propto)$ indexed using an allocated sector index n, where $\cos(\propto)$ is an angle corresponding to each sector index and where c is a constant and a power of 2.

33. An image processing system including digital logic for implementing the method of claim 29.

34. A method for producing a histogram of oriented gradients (HOG) for at least a portion of an image comprising:
dividing said image portion into cells, each cell comprising a plurality of image pixels;
associating at least one sector with a bin, each sector corresponding to a respective angle within a full circle, for each image pixel of a cell,
obtaining a horizontal gradient component, gx, and a vertical gradient component, gy, based on differences in pixel values along at least a row of said image and a column of said image respectively including said pixel; and
allocating a gradient weight to a sector of a pair of sectors bounding said pixel gradient according to a relative angle of said pixel gradient to each of the pair of sectors bounding said pixel gradient; and
allocating the gradient weight for a sector to an associated bin according to an angular relationship between said sector and said associated bin; and
accumulating a weighted pixel gradient for each pixel of a cell associated with a bin to provide a HOG for said cell.

35. A method according to claim 34 wherein said allocating a gradient weight W1 to a sector comprises calculating said gradient weight according to the formula:

$$W1 = \frac{a1}{a1 + a2} = 1 - W0$$

where a1 and a2 are the intra-sector angles of the pixel gradient, and where W0 comprises the weight for the other sector of the pair.

36. A method according to claim 35 wherein said angle a1 is approximated with said vertical gradient component gy, and said angle a1+a2 is approximated with a maximum vertical gradient component for a sector.

37. A method according to claim 36 comprising employing a lookup table Kw to approximate said angle a1+a2 as a function of said horizontal gradient component gx and calculating said weights W1, W0 according to the formulae:

$$W1 = \frac{gy(x, y) * Kw}{c} = 1 - W0$$

where c is a constant and a power of 2.

38. A method according to claim 34 wherein sectors extend along lines including $gx=2^n \cdot gy$, where n is any integer value with a magnitude greater than or equal to 1.

39. A method according to claim 34, wherein sectors each having an index n extend along lines: $b*16=a*(n+1)$ where $0 \leq n \leq 5$, b=gy and a=gx; and $b*16=a*(13-n)$ where $7 \leq n \leq 12$, a=gx+gy and b=gx-gy.

40. An image processing system including digital logic for implementing the method of claim 34.

* * * * *